(12) United States Patent
Koslowski et al.

(10) Patent No.: US 11,654,496 B2
(45) Date of Patent: May 23, 2023

(54) RING SAW

(71) Applicant: Hilti Aktiengesellschaft, Schaan (LI)

(72) Inventors: Oliver Koslowski, Puergen (DE); Bernhard Brehm, Calf (DE); John Van Taack-Trakranen, Munich (DE); Goran Golubovic, Buchloe (DE); Josef Schittl, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/624,087

(22) PCT Filed: Jun. 24, 2020

(86) PCT No.: PCT/EP2020/067612
§ 371 (c)(1),
(2) Date: Dec. 30, 2021

(87) PCT Pub. No.: WO2021/001225
PCT Pub. Date: Jan. 7, 2021

(65) Prior Publication Data
US 2022/0355398 A1    Nov. 10, 2022

(30) Foreign Application Priority Data

Jul. 3, 2019   (EP) ..................... 19184055

(51) Int. Cl.
*B23D 47/12*   (2006.01)
*B27B 5/14*    (2006.01)
*B23D 61/02*   (2006.01)

(52) U.S. Cl.
CPC ........... *B23D 47/123* (2013.01); *B23D 61/02* (2013.01)

(58) Field of Classification Search
CPC .. Y10T 83/7734; B23D 47/123; B23D 61/02; B23D 45/16; B27G 19/02; B28D 1/04
(Continued)

(56) References Cited

U.S. PATENT DOCUMENTS 3,930,310 A    1/1976  Santilli
4,472,880 A *  9/1984  Johansson ................. B27B 5/14
                                                 30/389

(Continued)

FOREIGN PATENT DOCUMENTS

AT          231147 B     1/1964
DE       1 403 691 A1    3/1969
(Continued)

OTHER PUBLICATIONS

PCT/EP2020/067612, International Search Report dated Sep. 18, 2020 (Two (2) pages).

*Primary Examiner* — Phong H Nguyen
(74) *Attorney, Agent, or Firm* — Crowell & Moring LLP (57) ABSTRACT

A ring saw includes a ring saw blade, a tool holder that guides the ring saw blade in a cutting plane, a motor, and a driving wheel where the ring saw blade is drivable in the cutting plane by the driving wheel and the driving wheel is coupled to the motor. A guide roller is disposed on a first side of the cutting plane where the ring saw blade is guidable by the guide roller from the first side. A guide roll is disposed on a second side of the cutting plane where the ring saw blade is guidable by the guide roll from the second side. The guide roll is disposed in a hood that is pivotable relative to the cutting plane.

8 Claims, 5 Drawing Sheets

(58) Field of Classification Search
USPC .................. 30/276, 388, 389; 125/13.01
See application file for complete search history.

(56) References Cited

U.S. PATENT DOCUMENTS

| | | | |
|---|---|---|---|
| 4,646,607 A | | 3/1987 | Johansson |
| 6,374,501 B1 * | | 4/2002 | Claesson .............. B23D 47/123 |
| | | | 30/389 |
| 6,442,841 B1 * | | 9/2002 | Nilsson .................. B23D 59/02 |
| | | | 30/389 |
| 2006/0064881 A1 * | | 3/2006 | Blatz .................... B23D 47/123 |
| | | | 30/389 |
| 2018/0185934 A1 * | | 7/2018 | Hsieh .................. B23D 47/123 |

FOREIGN PATENT DOCUMENTS

| | | |
|---|---|---|
| DE | 2 161 489 A1 | 6/1972 |
| EP | 0 060 971 A2 | 9/1982 |
| JP | 57-156123 A | 9/1982 |
| JP | 6263060 A | 3/1987 |

* cited by examiner

RING SAW

BACKGROUND AND SUMMARY OF THE INVENTION

The present invention relates to a ring saw.

Ring saws drive a ring saw blade eccentrically by means of a driving wheel. The eccentric drive requires guidance for the ring saw blade, which is achieved by means of rolls and wheels. In this case, high frictional losses can arise between the rolls and the ring saw blade. Moreover, changing the ring saw blade is laborious, especially since the driving wheel and rolls must be readjusted for good guidance.

According to one aspect of the invention, a ring saw has a tool holder for guiding a ring saw blade in a cutting plane, a motor, and a driving wheel, which is arranged in the cutting plane in order to drive the ring saw blade and is coupled to the motor. A guide roller is arranged on one side of the cutting plane in order to guide the ring saw blade from this one side. A guide roll is arranged on an opposite side of the cutting plane in order to guide the ring saw blade from this opposite side. The guide roll is arranged in a hood that can be pivoted relative to the cutting plane. By opening the hood, the user gains access to the tool holder. At the same time, the guide rolls are raised from the ring saw blade, and the locking of the ring saw blade is canceled. The user can exchange the ring saw blade without using tools.

In one embodiment, the tool holder can have a receiving space for receiving the ring saw blade, wherein the hood covers the receiving space. The driving wheel, the guide roller and the guide roll can be arranged in the receiving space.

In one embodiment, it is envisaged that a section of the lateral surface of the guide roll which faces the cutting plane extends parallel to the cutting plane.

In a preferred embodiment, the hood can be locked on a machine housing. The hood can be openable and closable by means of an actuating lever.

In another preferred embodiment, the driving wheel is movable in the cutting plane, and a movement of the hood and of the driving wheel is synchronized by means of a mechanism. An actuating lever can have an opening position and a closing position. The hood and the driving wheel are coupled to the actuating lever in such a way that, in the closed position, the hood is closed and the driving wheel is pressed against the ring saw blade and, in the opening position, the hood is open and the driving wheel is at a distance from the ring saw blade. The user does not require laborious adjustment or alignment to change a ring saw blade.

One embodiment envisages that, proceeding from the closing position into the opening position, the actuating lever first of all moves the driving wheel and then opens the hood.

The ring saw blade according to the invention has a flat annular support which has a side face and an outer circumference. One or more cutting elements are arranged along the outer circumference of the support. At least one annular groove is recessed into the side face. The groove has a radially inner flank and a radially outer flank. The radially inner flank is of conical design, and a cone describing the conical flank has a half opening angle of between 10 degrees and 30 degrees. The ring saw blade allows low-friction guidance by way of the sloping flanks. A guide roller can rotate approximately parallel to a rotation axis of the ring saw blade and, during this process, can rest against the groove. Moreover, the guide roller can have a larger diameter than the width of the groove. The orientation of the guide roller and the possible diameter thereof make a decisive contribution to a low frictional loss.

The radially outer flank preferably extends continuously below, i.e., on a side facing the support, a describing cone envelope that is perpendicular to the inner flank and extends through a point on the inner flank which is furthest away from the side face, i.e., the lowest point of the flank. A cylindrical guide roller can rest against the sloping inner flank.

A profile of the ring saw blade can be asymmetrical. The outer flank is preferably conical. A cone describing the conical flank has a half opening angle of between 50 degrees and 80 degrees. The asymmetrical shape ensures that there is little weakening of the support due to a minimal cross section of the groove.

According to one aspect of the invention, a ring saw has a tool holder for guiding a ring saw blade in a cutting plane E, a motor, a driving wheel, at least one guide roller and at least one guide roll. To drive the ring saw blade, the driving wheel is arranged in the cutting plane and coupled to the motor. The at least one guide roller is arranged on one side of the cutting plane. The at least one guide roll is arranged on the opposite side of the cutting plane. The guide roller is mounted in such a way as to be freely rotatable about an axis of rotation. The axis of rotation slopes by 50 degrees to 80 degrees relative to the cutting plane. The slope of the guide roller is approximately parallel to a rotation axis of the ring saw blade but can nevertheless rest in a guide groove of the ring saw blade. Moreover, the guide roller can have a larger diameter than the width of the guide groove. The orientation of the guide roller and the possible diameter thereof make a decisive contribution to a low frictional loss.

According to one embodiment, the guide roller can have at least one rolling element with a rotationally symmetrical lateral surface. In a preferred embodiment, the guide roller has two or more concentric rolling elements. A first of the rolling elements can have a smaller radius than a second of the rolling elements. The first of the rolling elements is arranged closer to the cutting plane along the axis of rotation, relative to the second of the rolling elements. That segment of the first rolling element which is closest to the cutting plane E and that segment of the second rolling element which is closest to the cutting plane E preferably lie in the same plane. The two closest segments preferably engage in the guide grooves of the ring saw blade.

In one embodiment, the first of the rolling elements is mounted on the second of the rolling elements. The required bearing is subjected only to the rotational speed of the smaller rolling element relative to the larger rolling element and not to the much higher absolute rotational speed relative to the machine housing.

The smaller rolling element rotates at a high absolute rotational speed relative to a machine housing, resulting in high stress on the bearings. Mounting on the larger rotating rolling element reduces the relative rotational speed acting on the bearings of the smaller rolling element.

One embodiment envisages that an axis of rotation of the guide roll and the axis of rotation of the guide roller lie in a plane perpendicular to the cutting plane.

In a preferred embodiment, the axis of rotation of the guide roll slopes relative to the cutting plane. The guide roll can be conical. The peripheral speed of the rolling lateral surface of the guide roll increases from the end closest to the rotation axis to the end remote from the rotation axis. The increase preferably corresponds approximately to the higher peripheral speed of regions of the ring saw blade which are further toward the outside in comparison with regions which are closer to the rotation axis. It is thus possible to reduce friction of the guide roll on the ring saw blade.

According to one aspect of the invention, a ring saw has a tool holder for guiding a ring saw blade in a cutting plane E, a motor, a driving wheel, at least one guide roller and at least one guide roll. To drive the ring saw blade, the driving wheel is arranged in the cutting plane and coupled to the motor. The at least one guide roller is arranged on one side of the cutting plane, and the at least one guide roll is arranged on the opposite side of the cutting plane. The ring saw has a bearing block, in which the driving wheel is mounted so as to be rotatable about a drive axis perpendicular to the cutting plane. The bearing block can be moved parallel to the cutting plane. Construction with the movable driving wheel enables the ring saw blade to be removed and inserted without using tools.

A preferred embodiment has a bevel gear mechanism that couples the driving wheel to the motor. The bevel gear mechanism has a crown wheel connected to the driving wheel. The crown wheel is mounted in the bearing block. Together, the driving wheel and the crown wheel form a movable unit. The bevel gear mechanism with the crown wheel is very insensitive to inaccurate positioning of the crown wheel. As a result, there is a good tolerance for the insertion of ring saw blades with slightly different widths.

According to one aspect of the invention, a ring saw has a tool holder for guiding a ring saw blade. The tool holder is arranged in a receiving space. A driving wheel serves to drive the ring saw blade and is arranged in the cutting plane and coupled to the motor. A guide roller is arranged on one side of the cutting plane in order to guide the ring saw blade from one side. A water guide has an outlet, which is directed at the guide roller. The guide roller is cleaned by the water, which then cools the ring saw blade.

One preferred embodiment envisages that the guide roller is arranged upstream of the receiving space in the direction of flow of the water flushing system. The guide roller can have a cylindrical rolling element for engagement in guide grooves of the ring saw blade. The outlet is directed at a lateral surface of the rolling element or at a surface facing away from the cutting plane. The water first of all comes into contact with the lateral surface before the water reaches the dusty or sludgy ring saw blade.

One embodiment envisages that the rolling elements are arranged in a pot which is sealed off from a machine housing and has an opening facing the receiving space. One segment of the rolling elements can be arranged within the receiving space, and one segment of the rolling elements can be arranged within the pot. The opening is preferably smaller than a cross section of the rolling element.

In one embodiment, the outlet is arranged within the pot. A channel which is connected to the outlet can have a helical portion extending around an axis of rotation of the guide roller. The water can be directed onto the guide roller in the direction of rotation of the latter.

The following description explains the invention with reference to exemplary embodiments and figures.

DETAILED DESCRIPTION OF THE DRAWINGS

Identical or functionally identical elements are indicated by the same reference symbols in the figures, unless stated otherwise.

Figure 1:
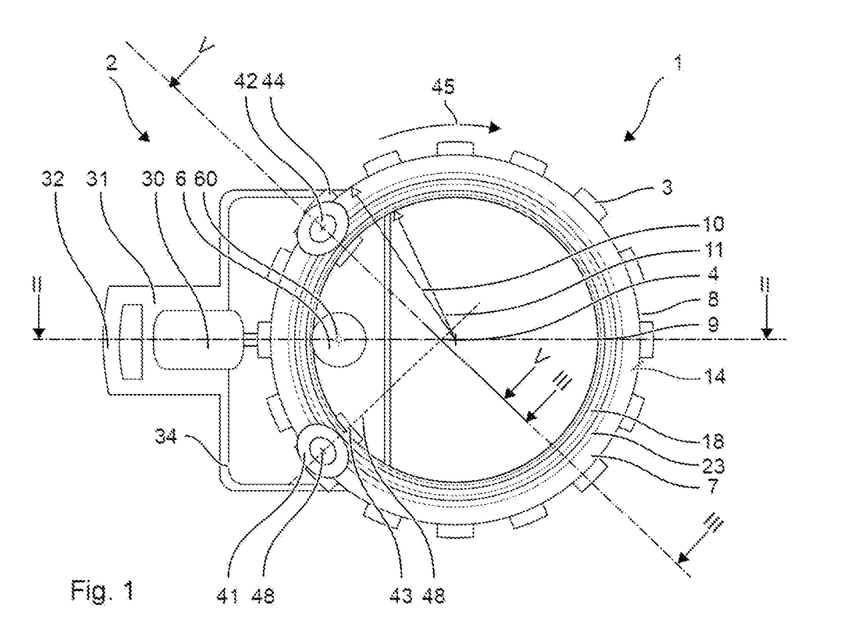
FIG. 1 shows a ring saw and a ring saw blade.
Figure 2:
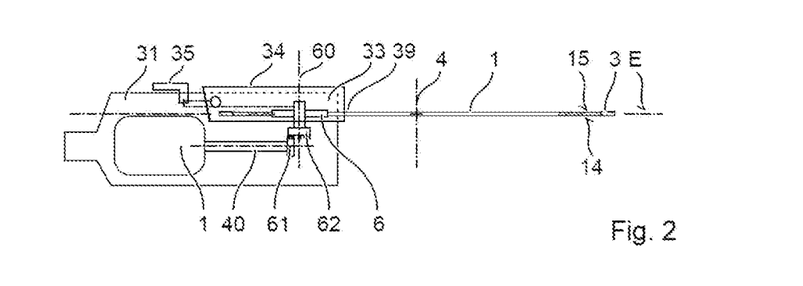
FIG. 2 shows a section in the plane II-II.

A schematic illustration of a ring saw blade 1 and of a ring saw 2 are illustrated in a plan view in FIG. 1 and in a vertical section in the plane II-II. The ring saw blade 1 has the form of a flat annular disk with cutting elements 3 situated radially on the outside. The form defines a rotation axis 4 around which the ring saw blade 1 is rotated in use. The ring saw 2 has a tool holder 5, in which the ring saw blade 1 is mounted so as to be rotatable about the rotation axis 4. Driving takes place eccentrically with respect to the rotation axis 4 by means of a driving wheel 6, which rests against an annular inner circumference of the hollow ring saw blade 1.

Based on the intended use and on the cylindrical symmetry of the ring saw blade 1, the description of the ring saw blade 1 introduces the rotation axis 4 and a cutting plane E oriented perpendicularly to the rotation axis 4. The point of intersection of the rotation axis 4 and the cutting plane E coincides with the geometrical center or center of gravity of the ring saw blade 1. The cutting plane E corresponds to the plane in which the ring saw blade 1 cuts a workpiece, substrate etc. In the following description, the direction indications axial and radial relate to the rotation axis 4, unless explicitly indicated otherwise. A radially inner element is arranged closer to the rotation axis 4 than a radially outer element, which, conversely, is arranged closer to the outer circumference of the ring saw blade 1.

The ring saw blade 1 has a flat support 7 in the form of a hollow circle. In the radial direction, the support 7 in the form of a hollow circle is bounded by an outer circumference 8 and an inner circumference 9. The outer circumference 8 and the inner circumference 9 are concentric and symmetrical with respect to the rotation axis 4. The inner circumference 9 is circular, while the outer circumference 8 is preferably circular or approximately circular. The outer circumference 8 is at a distance corresponding to an outer radius 10 from the rotation axis 4. Similarly, the inner circumference 9 is described by an inner radius 11 in relation to the rotation axis 4. A width of the support 7 refers to the difference between the outer radius 10 and the inner radius 11. A ratio of the inner radius 11 to the outer radius 10 is preferably greater than 50%, e.g. greater than 66%. A front side 14 in the form of a hollow circle and a rear side 15 in the form of a hollow circle delimit the support 7 along the rotation axis 4. The rear side 15 is preferably flat and unstructured. The rear side 15 can be parallel to the cutting plane E. The front side 14 is preferably substantially flat and preferably parallel to the cutting plane E. A height 16 of the flat support 7, i.e., the dimension thereof along the rotation axis 4, is significantly less than the radii.

The front side 14 of the support 7 has a substantially flat main surface 17, which typically extends parallel to the cutting plane E, and at least one annular (guide) groove 18. The guide groove 18 is concentric with the inner circumference 9 of the support 7, i.e., extends at a constant distance around the rotation axis 4. Guide groove 18 is of substantially rotationally symmetrical design. A profile of the guide groove 18 is constant around the rotation axis. The profile denotes the cross section in a plane containing the rotation axis 4, e.g., plane III-III, as in FIG. 3. The profile of the guide groove 18 illustrated has a radially inner guide flank 19, a radially outer flank 20, and a groove base 21 arranged between the guide flank 19 and the outer flank 20. The groove base 21 forms the deepest region of the guide groove 18, i.e., the groove base 21 is the region of the groove 18 closest to the rear side 15. The depth 22 of the guide groove 23 denotes the distance between the groove base 21 and the main surface 17 of the front side 1. The illustrative groove base 21 is flat and parallel to the cutting plane E. In other embodiments, the groove base 21 can have a circular line without extension in which the guide flank 19 and the outer flank 20 touch one another. The guide flank 19 and the outer flank 20 each extend from the main surface 17 to the groove base 21.

Figure 3:
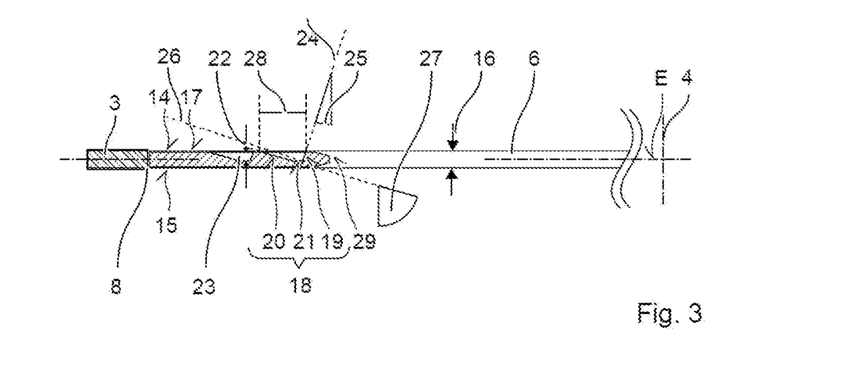
FIG. 3 shows a groove profile of a ring saw blade, section III-III.

The guide flank 19 rises in an axial direction from the groove base 21 to the main surface 17 along a radial direction toward the rotation axis 4. The guide flank 19 is conical. The describing cone 24 is symmetrical with respect to the rotation axis 4, and a tip of the cone lies on the same side of the cutting plane E as the front side 14 and the guide groove 18. A half opening angle 25 of the cone 24 is less than 30 degrees, preferably less than 25 degrees, and greater than 10 degrees, preferably greater than 15 degrees. The guide flank 19 is steep relative to the cutting plane E, without being perpendicular, however.

The outer flank 20 falls in an axial direction from the main surface 17 of the front side 14 to the groove base 21 along a radial direction toward the rotation axis 4. The flank 20 extends continuously below or on a cone 26 defined by the guide flank 19 and the depth 22 of the guide groove 18. This bounding cone 26 is perpendicular to the conical guide flank 19 and passes through the lowest point of the guide flank 19. In this context, "below" indicates that the flank 20 is on the same side of the cone 26 as the rear side 15. Thus, the cone 26 passes through the cavity of the guide groove 18 and enters the support 7 only at the guide flank 19 in the direction of the rotation axis 4. The guide flank 19 is continuously above the cone envelope. The opposing flank 20 can be embodied in various ways. The flank 20 preferably falls monotonically. In a preferred embodiment, the opposing flank 20 has a conical form. The describing cone is symmetrical with respect to the rotation axis 4; a tip of the cone lies on the opposite side of the support 7 from the front side 14. A half opening angle 27 of the cone is greater than 50 degrees, preferably greater than 60 degrees, and preferably less than 75 degrees, e.g., less than 70 degrees. The outer flank 20 is thus significantly longer than the guide flank 19.

Figure 4:
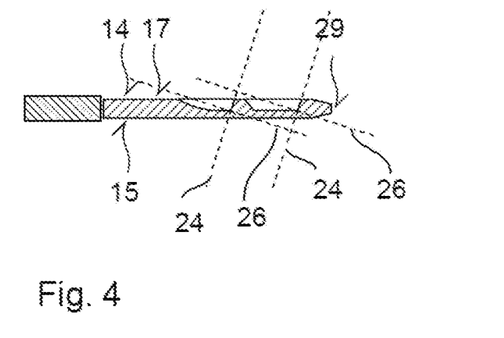
FIG. 4 shows alternative groove profiles of the ring saw blade.

The guide groove 18, 23 has a highly asymmetrical profile. A sum of the half opening angles 25, 27 of the cone describing the guide flank 19 and the opposing flank 20 is preferably greater than 90 degrees, but preferably less than 120 degrees. The guide flank 19 contributes only slightly, e.g., less than 20%, to the width 28 of the guide groove 18, i.e., to the radial dimension thereof. The majority of the width 28 is occupied by the other flank 19 and the groove base 21. The width 28 is at least three times, e.g., at least four times, as great as a depth 22 of the guide groove 18, i.e., the dimension thereof along the rotation axis 4. The embodiment with an elongate opposing flank 20 is preferred since this hollow profile has a relatively small cross-sectional area. The support 7 is thus more stable. This applies especially if two or more guide grooves are provided. In another embodiment, the groove base occupies at least three quarters of the width of the groove. The other flank may be described by a cone with a similar opening angle to the guide flank, cf. FIG. 4. The front side 14 can have two guide grooves 18, 23. The two guide grooves 18, 23 are concentric with one another. In the embodiment illustrated, both guide grooves 18, 23 have the same profile. The guide grooves 18, 23 differ only in the radius thereof.

The inner circumference 9 of the support 7 serves as a running surface 29. The running surface 29 can be obtuse or rounded or, as is preferred, can have a trapezoidal cross section. The running surface 29 has the shape of a body of revolution, the axis of symmetry of which coincides with the rotation axis 4.

When cutting a substrate with the ring saw blade 1, the ring saw blade 1 plunges into the substrate in the cutting plane E. Along the outer circumference 8 of the support 7, the cutting elements 3 are arranged in the cutting plane E. The cutting elements 3 project in a radial direction from the support 7. Furthermore, the cutting elements 3 also protrude from the support 7 in both axial directions. The cutting elements 3 are thus thicker than the support 7, i.e., they have a larger dimension along the rotation axis 4. The slot cut by the cutting elements 3 is sufficiently wide to enable the support 7 to be inserted into the slot. The cutting elements 3 can be abrasive or chip-forming. For example, the cutting elements contain diamond particles or similarly hard grains, which are embedded in a matrix. The support 7 is preferably manufactured from a steel.

The ring saw 2 is preferably a hand-held power tool or portable power tool. The ring saw 2 has a tool holder 5 for guiding a ring saw blade 1. A motor 30 is used to drive the ring saw blade 1, which is guided in the tool holder 5. The motor 30 is arranged in a machine housing 31. A handle 32 for holding and guiding the ring saw 2 during sawing is arranged on the machine housing 31. The ring saw 2 preferably has two handles or a handle which can be gripped with both hands. An illustrative handle is designed as a hoop. The handle 32 is arranged on a machine housing 31 of the ring saw 2.

The tool holder 5 can be locked and unlocked by the user without a tool in order to insert or remove the ring saw blade 1. The tool holder 5 is based on a plurality of rollers, which rest against the opposite side faces 14, 15 of the ring saw blade 1. The tool holder 5 has a receiving space 33 for the ring saw blade 1, the space preferably being covered by a hood 34. The user can remove the hood 34 from the machine housing 31 or swing it open, pivot it etc. relative to the machine housing 31. The opening and closing of the hood 34 as well as the unlocking and locking of the tool holder 5 can be accomplished by means of an actuating lever 35, for example.

Figure 5:
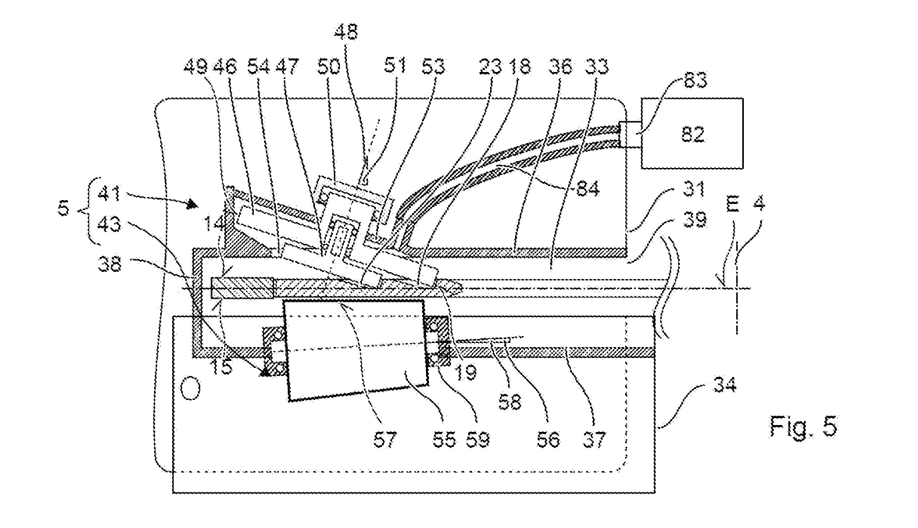
FIG. 5 shows a section in the plane V-V through a guide roller and a guide roll.

The following description of the tool holder 5 relates to the locked position thereof, while the ring saw 2 is being operated, that is to say in operation (FIG. 5).

The tool holder 5 has a receiving space 33 for the ring saw blade 1. The receiving space 33 is preferably surrounded along the rotation axis 4 by a bottom 36 and a top 37 and in the radial direction by a side wall 38. The bottom 36 is arranged on one side of the cutting plane E, and the top 37 on the opposite side. The bottom 36 and the top 37 extend substantially along the cutting plane E. The side wall 38 extends around the rotation axis 4 in the circumferential direction and can be of cylindrical design. The receiving space 33 has an inlet opening 39 and an outlet opening, through which the ring saw blade 1 can enter and leave the receiving space 33. The bottom 36 can be formed by an outer surface of the machine housing 31. The top 37 can be formed by an inner surface of the hood 34. The receiving space 33 is preferably designed to be dust-tight and water-tight relative to the machine housing 31 in order to protect the electric motor 30, the transmission 40 etc. of the ring saw 2 from sawdust or water introduced by the ring saw blade 1.

The tool holder 5 of the ring saw 2 is arranged within the receiving space 33. The tool holder 5 is based on guide rollers 41, 42 and guide rolls 43, 44. The guide rollers 41, 42 are arranged on one side of the cutting plane E, and the guide rolls 43, 44 are arranged on the opposite side of the cutting plane E. The illustrative guide rollers 41, 42 project with respect to the bottom 36 into the receiving space 33. The illustrative guide rolls 43, 44 project into the receiving space 33, starting from the top 37. The guide rollers 41, 42 engage in the guide grooves 18, 23 of the ring saw blade 1. The guide rolls 43, 44 rest against the preferably smooth rear side 15 of the ring saw blade 1. The illustrative ring saw 2 has two guide rollers 41, 42, which are arranged offset around the rotation axis 4 along a circumferential direction 45. Other embodiments have just one guide roller or up to four guide rollers. The guide rolls 43, 44 are preferably arranged opposite the guide rollers 41, 42, i.e., in the same angular position around the rotation axis 4. The pair comprising a guide roller 41 and an opposite guide roll 43 clamps the ring saw blade 1 between them. An axial distance between the guide roller 41 and the guide roll 43 corresponds to the thickness 16 of the ring saw blade 1 provided or inserted.

The guide roller 41 has at least one rolling element 46, 47, which is mounted so as to be rotatable around an axis of rotation 48. The axis of rotation 48 and the rolling element 46 slope relative to the cutting plane E in such a way that a section of the rolling element 46 which faces the rotation axis 4 engages in the guide groove 18. A section of the rolling element 46 which faces away from the rotation axis 4 is correspondingly spaced apart from the ring saw blade 1 along the axial direction. The rolling element 46 has a rotationally symmetrical lateral surface 49. The illustrative lateral surface 49 has a cylindrical shape. The lateral surface 49 rests against the guide groove 18 of the ring saw blade 1. The driven ring saw blade 1 moves the rolling element 46, ditto the guide roller 41. The sloping alignment of the guide roller 41 enables the guide roller 41 to be taken along by the ring saw blade 1 without friction or with little friction. The low friction increases the efficiency of the ring saw 2 and the life of the guide rollers 41.

The guide roller 41 or the rolling elements 46, 47 of the guide roller 41 are mounted in such a way as to be rotatable around the axis of rotation 48 in a force-free and low-friction manner. Admittedly, the guide roller 41 is not driven directly by the motor 30. However, the guide roller 41 is moved by being taken along by means of the ring saw blade 1. The high ratio of the diameter of the ring saw blade 1 to the diameter of the rolling element 46 entails high rotational speeds of the rolling element 46. The rolling element 46 is therefore preferably mounted in a low-friction bearing 50, e.g., a ball bearing, in order to avoid frictional losses due to the rapidly rotating guide roller 41. The rolling element 46 is mounted in a ball bearing, for example.

As mentioned, the axis of rotation 48 slopes relative to the cutting plane E. The axis of rotation 48 can lie in the same plane as the rotation axis 4. In the embodiment illustrated, the rotation axis 4 and the axis of rotation 48 are arranged in a skewed manner. The rotation axis 4 and the axis of rotation 48 do not intersect one another and are not parallel. That point on the axis of rotation 48 which is closest to the rotation axis 4 is on the same side of the cutting plane E as the guide roller 41. Starting from the guide roller 41, the axis of rotation 48 extends toward the rotation axis 4 in a radial direction and, at the same time, extends away from the cutting plane E and the front side 14 of the ring saw blade 1. The slope of the axis of rotation 48 relative to the cutting plane E is translated into a slope of the rolling element 46 which is at a greater distance from the cutting plane E with increasing distance from the rotation axis 4. The slope angle 51 of the axis of rotation 48 relative to a line perpendicular to the cutting plane E is less than 30 degrees, preferably less than 25 degrees, and greater than 10 degrees, preferably greater than 15 degrees. In the case of the illustrative cylindrical rolling element 46, the slope angle 51 is equal to the slope of the guide flank 19 of the ring saw blades 1 provided for the ring saw 2.

The number of rolling elements 46, 47 is matched to the number of guide grooves 18, 23 of the ring saw blades 1 provided. The illustrated and preferred embodiment has two rolling elements 46, 47. Other embodiments have one rolling element 46 or up to four rolling elements. The rolling elements 46, 47 are arranged coaxially and mounted so as to be rotatable around the same axis of rotation 48. The radii of the rolling elements 46, 47 or the lateral surfaces 49 thereof are different. The inner guide groove 18 is further away from the axis of rotation 48 than the outer guide groove 23 of the inserted ring saw blade 1. Accordingly, the rolling element 46 associated with the inner guide groove 18 has a larger radius than the rolling element 47 associated with the outer guide groove 23. The smaller rolling element 47, or at least the lateral surface thereof, associated with the inner guide groove 18 is arranged offset in the direction of the cutting plane E along the axis of rotation 48, relative to the larger rolling element 46 associated with the outer guide groove 18. The offset between the smaller rolling element 47 and the larger rolling element 46 is such that the sections thereof which face the rotation axis 4 are at the same distance from the cutting plane E. The offset is defined trigonometrically by the difference between the radii and the slope angles 51. The two rolling elements 46, 47 preferably engage to the same depth or approximately the same depth in the guide grooves 18, 23.

Owing to its smaller radius and, in addition, the larger circumference of the outer guide groove 23, the smaller rolling element 47 rotates significantly more quickly than the larger rolling element 46. The smaller rolling element 47 is therefore preferably not mounted directly in the machine housing 31. In a preferred embodiment, the smaller rolling element 47 is mounted on the larger rolling element 46. The bearing, e.g., a ball bearing, is subject to stress only in respect of a speed difference between the two rolling elements. The larger rolling element 46 is mounted in a bearing 50 secured in the machine housing 31. During sawing, the ring saw blade 1 is supported on the guide rollers 41 in the radial direction 68, i.e., in the cutting plane E, via its guide grooves 18. The guide rollers 41 transmit the forces directly to the machine housing 31.

The illustrative guide rollers 41 are mounted in the machine housing 31. The rolling elements 46, 47 project into the receiving space 33. The rolling elements 46, 47 are exposed to dust and water. To ensure that dust and water do not penetrate into the machine housing 31, at least the rolling elements 46, 47 of the guide roller 41 are isolated from the machine housing 31. The rolling elements 46 are arranged in a pot 53, which is sealed off from the machine housing 31 and is open toward the receiving space 33. The pot 53 or the interior of the pot 53 is, for example, of cylindrical design and formed coaxially with the axis of rotation 48 of the rolling elements 46. The pot 53 has an opening 54 which faces the receiving space 33 and through which the rolling elements 46, 47 enter the receiving space 33. The opening 54 lies in the same plane as the bottom 36. The rolling elements 46, 47, which preferably slope relative to the cutting plane E and the bottom 36, can be arranged fully or partially within the receiving space 33. For example, only a segment of the rolling elements 46 which is closer to the cutting plane E projects through the opening 54 into the receiving space 33. This segment makes contact with the ring saw blade 1. The remaining segment can be shielded from the receiving space 33 by the bottom 36. The associated opening 54 in the pot 53 is slot-shaped or circular-segment-shaped, for example, to match the intersection profile of the sloping rolling element 46 with the plane of the bottom 36. The volume of the pot 53 is designed to be as small as possible to ensure that no dust, dirty water etc. can accumulate therein. The volume of the pot 53 is, for example, no more than three times, e.g., no more than two times, e.g., no more than one and a half times, the volume of the rolling elements 46, 47 of the guide roller 41. A diameter of the pot is approximately equal to the diameter of the larger rolling element 46, e.g., no more than 30% larger.

The guide roll 43 has a rolling element 55 which is mounted so as to be rotatable about an axis of rotation 56 (FIG. 5). The rolling element 55 has a cylindrical or preferably a conical lateral surface 57. The lateral surface 57 is aligned parallel to the cutting plane E, at least in operation or when the tool holder 5 is locked. The ring saw blade 1 rests on the lateral surface 57 parallel to the cutting plane E or is supported by the lateral surface 49. The axis of rotation 57 is arranged in a manner oriented largely radially with respect to the rotation axis 4. As a result, the rolling element 55 can roll with little friction on the rotating ring saw blade 1. Like the guide rollers, the guide roll 43 is mounted in a low-friction and force-free manner. The preferred rolling element 55 has a conical lateral surface 55. The radius of the rolling element 55 decreases with decreasing distance from the rotation axis 4. The ratio of the radius of the rolling element 55 to the distance from the rotation axis 4 along the axis of rotation 56 is preferably constant or approximately constant. A deviation from a mean value of the ratio is less than 2%. The lateral surface 57 is described by a cone, the half opening angle of which is 2 degrees to 5 degrees, for example. The slope angle 58 of the axis of rotation 57 relative to the cutting plane E is equal to the half opening angle. The axis of rotation 57 of the guide roll 43 preferably lies in the same plane as the axis of rotation 48 of the opposing guide roller 41. The plane is furthermore perpendicular to the cutting plane E or parallel to the rotation axis 4. Even if the lateral surfaces of the guide roller 41 and the guide roll 43 slope relative to one another, there are only slight shear forces, if any, between the guide flank 19 and the rear side 15 owing to the fact that the orientation of the axes of rotation is the same.

In the illustrated and preferred embodiment, the tool holder 5 has two pairs of guide rollers 41 and guide rolls 43. The axis of rotation 48 of the guide roller 41 and the axis of rotation 57 of the guide roll 43 of each pair lie in the same plane. The two planes intersect on a line K which is parallel to the rotation axis 4. The line K can lie on the rotation axis 4 or can be offset with respect to the rotation axis 4. This reflects the ability of this ring saw 2 to accept ring saw blades 1 of different diameters. Since the position of the rotation axis 4 is defined by the guide grooves 18 of the ring saw blade 1, the position of the rotation axis 4 relative to the ring saw 2 is specified only in the context of the ring saw blades 1 provided. This notwithstanding, the rotation axis 4 is a sufficiently defined reference for direction indications.

Figure 6:
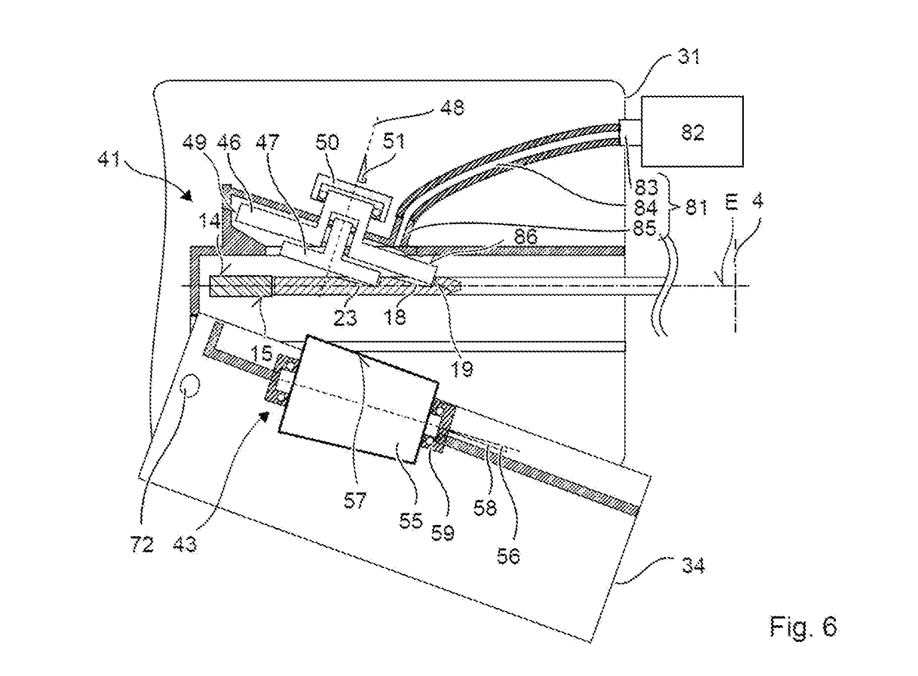
FIG. 6 shows a section in the plane V-V with the hood open.

The tool holder 5 can be unlocked without a tool in order to remove the ring saw blade 1. According to one embodiment, it is envisaged that the guide rolls 43 can be moved away from the cutting plane E and, where applicable, from the inserted ring saw blade 1 in order to cancel the fixing along the rotation axis 4. The guide rolls 43 are suspended on an inner side of the hood 34, for example, as illustrated schematically in FIG. 6. Rotary bearings 59, in which the guide rolls 44 are mounted so as to be rotatable about the axis of rotation 56, can be secured on the hood 34. When the hood 34 is closed, the guide rolls 43 rest against the ring saw blade 1, and the tool holder 5 is locked, as described above. When the hood 34 is opened, the guide rolls 43 are moved away from the cutting plane E and, where applicable, from the inserted ring saw blade 1. In the exemplary embodiment, the guide rolls 44 are pivoted together with the hood 34 relative to the cutting plane E. The tool holder 5 is unlocked, and the ring saw blade 1 can be removed. A releasable lock, which prevents accidental opening of the hood 34 and associated unlocking of the tool fitting, is preferably provided.

Figure 7:
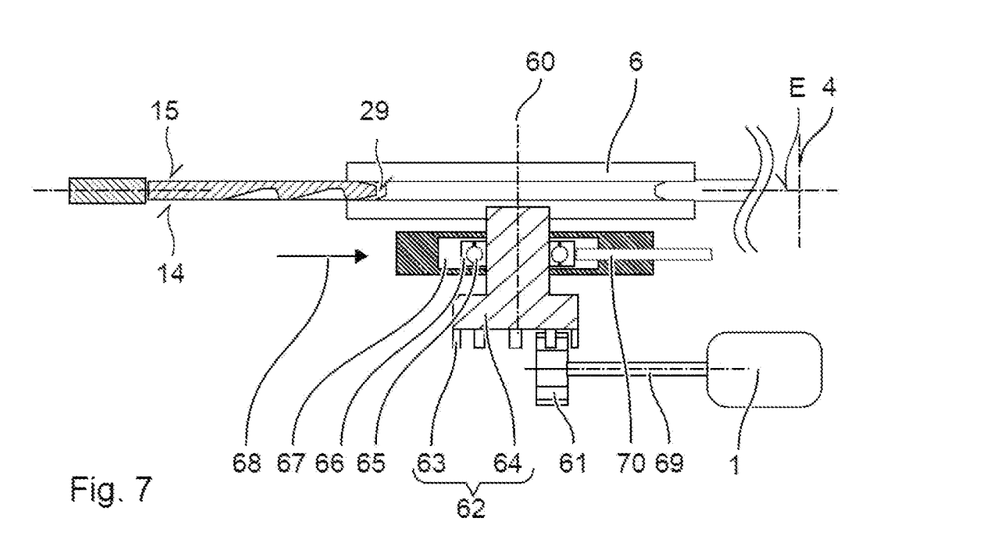
FIG. 7 shows the drive.

The drive of the ring saw 2 contains the driving wheel 6, the illustrative electric motor 30 and a transmission 40, which couples the electric motor 30 to the driving wheel 6 (FIG. 7). Other motors, e.g., internal combustion engines, can be used instead of the electric motor 30. The driving wheel 6 is arranged in the cutting plane E and eccentrically with respect to the rotation axis 4. A drive axis 60 of the driving wheel 6 is offset with respect to the rotation axis 4. The drive axis 60 and the rotation axis 4 are preferably parallel. The driving wheel 6 rolls on the running surface 29 of the ring saw blade 1, i.e., on the inner circumference 9 of the support 7. A diameter of the driving wheel 6 is correspondingly smaller than the inner radius 11 of the ring saw blades 1 provided for the ring saw 2. The transmission 40 can contain various components for adapting the rotational speed or torque, safety clutches etc.

The driving wheel 6 is preferably movable in the cutting plane E in order to make it easier to remove the ring saw blade 1 from the tool holder 5. The movement is made possible by a bevel gear mechanism 40 having an input-side pinion 61 and output-side crown wheel 62 (FIG. 7). The crown wheel 62 is distinguished by teeth 63 which project from a base plate 64 along the drive axis 60. The teeth 63 are arranged around a cavity which is rotationally symmetrical, e.g., cylindrical, with respect to the drive axis 60. The teeth 63 can be cylindrical or prismatic in shape or of some other shape. In a preferred embodiment, the teeth 63 have a prismatic shape, the triangular, prismatic base surface of which is oriented tangentially to the circumference of the crown wheel 62 or to some other circle around the drive axis 60. The driving wheel 6 and the crown wheel 62 are mounted in a bearing 65 so as to be rotatable about the drive axis 60. The bearing block 66 is mounted on a slide 67, which can be moved along a radial direction 68 parallel to the cutting plane E. The slide 67 is movable parallel to an axis 69 of the input-side pinion 61. The slide 67 can be coupled, by means of a linkage 70 for example, to an actuating lever 35, by means of which the user can move the slide 67. A releasable lock is preferably provided, the lock fixing the slide 67 in the locked position of the tool holder 5.

The user can lock (FIG. 8) and unlock (FIG. 10) the tool holder 5, preferably by means of an actuating lever 35. The actuating lever 35 has a closing position (FIG. 8), in which the tool holder 5 is locked, and an opening position (FIG. 10), in which the tool holder 5 is unlocked. In the opening position of the actuating lever 35, the contact between the guide rolls 43 and the ring saw blade 1 is canceled. The contact between the driving wheel 6 and the ring saw blade 1 is furthermore preferably canceled. The ring saw blade 1 rests loosely on the guide rollers 41, from which the user can raise and remove it. When inserting a new ring saw blade 1, the user lays the blade on the guide rollers 41 by means of the guide grooves 18. The guide grooves 18 already ensure correct alignment of the ring saw blade 1 in the cutting plane E. In response to the closing position of the actuating lever 35, the guide rolls 43 are brought into contact with the ring saw blade 1, and the tool holder 5 is thus locked. In the closed position, the driving wheel 6 is preferably in contact with the ring saw blade 1.

The hood 34 preferably covers the tool holder 5 and the driving wheel 6. When the hood 34 is open, the guide rollers 41, the guide rolls 43 and the driving wheel 6 are accessible to the user, thus enabling the user to remove or insert the ring saw blade 1. The hood 34 is preferably opened and closed by means of the actuating lever 35 in accordance with the opening position and the closing position. The actuating lever 35 can operate the hood 34 and the tool holder 5 simultaneously.

Figure 8:
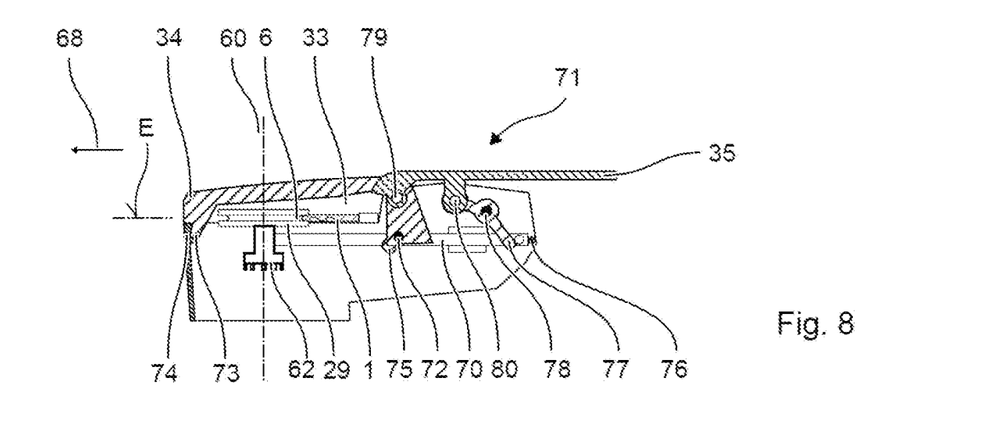
FIG. 8 shows the mechanism for removing and locking a ring saw blade in the closed position.
Figure 9:
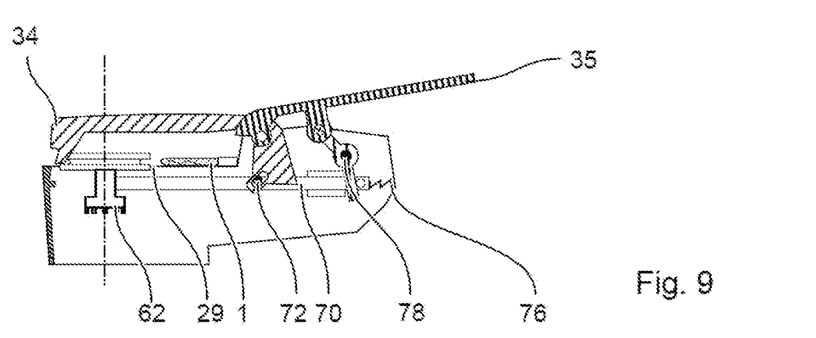
FIG. 9 shows the mechanism for removing and locking a ring saw blade in an intermediate position.
Figure 10:
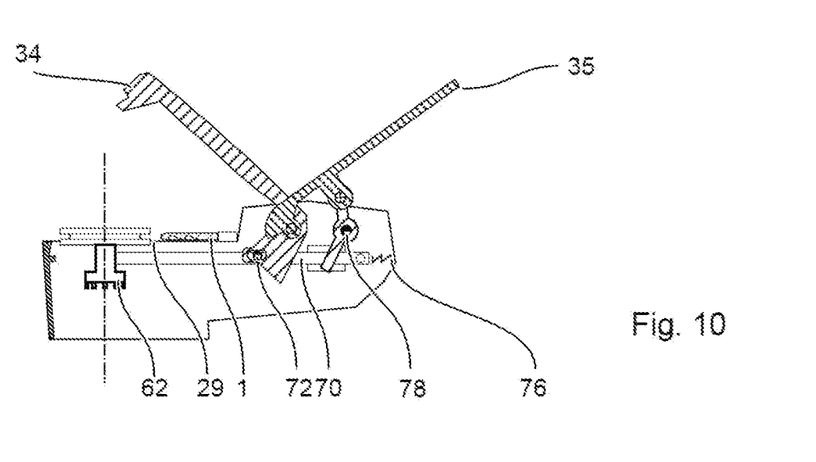
FIG. 10 shows the mechanism for removing and locking a ring saw blade in the open position.

An illustrative actuating lever 35 and a mechanism 71 for operating the tool holder 5 and the hood 34 is explained in conjunction with FIG. 8 to FIG. 10. The actuating lever 35 latches in in the closing position. A force emanating from the tool holder 5 or the hood 34 preferably pushes the actuating lever 35 into the closing position. In other embodiments, the actuating lever 35 can be fixed in the closing position by the user by means of a pin or similar.

In the closing position of the actuating lever 35, the hood 34 is closed. The hood 34 is suspended in such a way as to be pivotable about a pivot joint 72 relative to the machine housing 31. The pivot joint 72 is arranged in a fixed location in the machine housing 31. The hood 34 preferably has a catch which prevents accidental opening of the hood 34. The catch must be released by the actuating lever 35. In the closed position, the catch is locked by the actuating lever 35. An illustrative catch is based on a latch 73, which engages in a pocket 74 in the machine housing 31. The latch 73 is formed as a nose projecting in the radial direction 68 on the hood 34, for example. The associated pocket 74 in the machine housing 31 has a recess that is set back in the radial direction 68 and is preferably designed to interlock with the nose. The latch 73 rests against the pocket 74 in a circumferential direction around the pivot joint 72. The pivoting motion around this pivot joint 72 is thereby inhibited. The latch 73 can be moved away from the pocket 74 along the radial direction 68. The latch 73 and the pocket 74 no longer overlap along the circumferential direction around the pivot joint 72, and the inhibition of the pivoting motion is canceled. For this purpose, the hood 34 can be moved along the radial direction 68 in the machine housing 31, for example. The hood 34 is attached to the pivot joint 72 via a slotted hole 75. The slotted hole 75 preferably slopes relative to the radial direction 68. The hood 34 can thus be pivoted about the pivot joint 72 and moved a short distance along the radial direction 68. The catch is closed when the pivot joint 72 is resting on the end of the slotted hole 75 close to the catch, and the catch is open when the pivot joint 72 is resting on the end of the slotted hole 75 remote from the catch. The actuating lever 35 moves the hood 34 relative to the pivot joint 72 in such a way that the catch is closed in the closed position of the hood 34. Proceeding from the closing position to an intermediate position (FIG. 9), the actuating lever 35 pulls the hood 34 counter to the radial direction 68 and pulls the latch 73 out of the pocket 74. Proceeding from the intermediate position to the opening position, the hood 34 is pivoted about the pivot joint 72. Together with the hood 34, the guide rolls 43 are pivoted relative to the cutting plane E and, where applicable, to the ring saw blade 1.

The actuating lever 35 is coupled to the linkage 70 for moving the driving wheel 6. The movable driving wheel 6 can be preloaded into the unlocking position by a spring 76. The spring 76 presses on the linkage 70 in the radial direction 68 toward the rotation axis 4, for example. In its open position, the actuating lever 35 releases the linkage 70, which, driven by the spring 76, moves into the unlocking position (FIG. 9). During locking by the actuating lever 35, an auxiliary arm 77 of the actuating lever 35 pushes the linkage 70 counter to the radial direction 68. The auxiliary arm 77 is preferably decoupled from the linkage 70 until the guide rolls 43 are not touching the ring saw blade 1. The guide grooves 18 can thus rest on the guide rollers 41 and align the ring saw blade 1 without interference from a radially acting force. Only as soon as the guide rolls 43 press the guide grooves 18 against the guide rolls 43 and fix them are the radial forces introduced through the driving wheel 6. The auxiliary arm 77 can be attached to the machine housing 31 via a pivot joint 78, for example. In response to its position, the actuating lever 35 pivots the auxiliary arm 77 into different positions.

The illustrative linkage mechanism 71 contains a four bar linkage which couples the actuating lever 35 to the hood 34 and the machine housing 31. The hood 34 and the auxiliary arm 77 are attached to fixed-location joints 72, 78, for example. The actuating lever 35 is coupled to a joint 79 that is taken along by the hood 34 and to a joint 80 that is taken along by the auxiliary arm 77.

In operation, the ring saw blade 1 is flushed with water by a water flushing system 81. The water cools the cutting elements 3. Cooling is necessary especially in the case of the heat-sensitive diamond-containing cutting elements 3. The disadvantage with using water for cooling is that the water mixes with the dust formed during sawing to form a sludge. The sludge is in part taken up by the ring saw blade 1 and carried into the ring saw 2. The abrasively acting sludge contributes to wear, especially that of moving elements.

One embodiment of the ring saw 2 reduces wear by means of the water. The water is fed in within the receiving space 33 of the tool holder 5 adjoining the guide roller 41. The still clean water flows around the rolling elements 46, 47 of the guide roller 41. The mechanically highly stressed contact regions can be kept free from sludge, or at least the entry of sludge is reduced in the contact regions. In a preferred embodiment, the rolling elements 46, 47 are situated upstream of the receiving space 33 in the direction of flow of the water. The water flows around at least one section of the rolling elements 46 before the water comes into contact with dust, sludge etc. in the receiving space 33.

Figure 11:
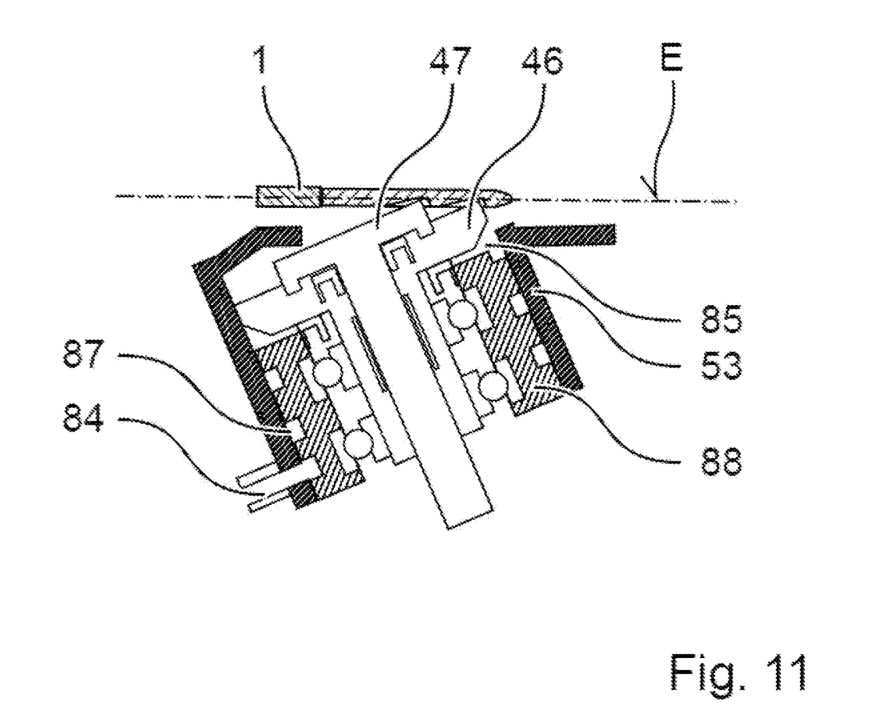
FIG. 11 shows the water guide, section in the plane V-V.

The water is provided by an external water supply 82. The water supply 82 can comprise, inter alia, a filled tank or flowing water from a public or private water supply network. The water supply 82 can collect, filter and recirculate the water used. The water is preferably under pressure, e.g., by virtue of a raised position of the tank or of a pressure-boosting pump. The ring saw 2 has a water connection 83 for connection to the water supply 82. Channels 84 in the ring saw 2 carry the water from the water connection 83 into the receiving space 33 of the tool holder 5. The water preferably enters the receiving space 33 at or close to the guide rollers 41. For example, the water is fed in via the pot 53 in which the rolling elements 46, 47 are arranged. The water flows over the rolling elements 46, 47 into the receiving space 33. Rolling element 46 is thus situated upstream of the receiving space 33 in the direction of flow of the inflowing water. In particular, the water flows over the highly stressed lateral surfaces 49 into the receiving space 33. An outlet 85 of the channel 84 is directed at the lateral surface 49 or at a surface 86 of the rolling element 46 which faces away from the receiving space 33, for example. The channel 84 can have a helical portion 87. The helical portion 87 is arranged around the axis of rotation 48 of the guide roller 41. The portion 87 can be arranged between a bearing block 88 for the outer rolling element 46 and the wall of the pot 53, for example.

The invention claimed is:

1. A ring saw (2), comprising:
    a ring saw blade (1);
    a tool holder (5), wherein the tool holder (5) guides the ring saw blade (1) in a cutting plane (E);
    a motor (30);
    a driving wheel (6), wherein the ring saw blade (1) is drivable in the cutting plane (E) by the driving wheel (6) and wherein the driving wheel (6) is coupled to the motor (30);
    a guide roller (41) which is disposed on a first side of the cutting plane (E), wherein the ring saw blade (1) is guidable by the guide roller (41) from the first side; and
    a guide roll (43) which is disposed on a second side of the cutting plane (E), wherein the ring saw blade (1) is guidable by the guide roll (43) from the second side;
    wherein the guide roll (43) is disposed in a hood (34) that is pivotable relative to the cutting plane (E);
    wherein the driving wheel (6) is movable in the cutting plane (E) and wherein a movement of the hood (34) and of the driving wheel (6) is synchronized by a linkage mechanism (71).

2. The ring saw (2) as claimed in claim 1, wherein the tool holder (5) has a receiving space (33), wherein the ring saw blade (1) is disposed in the receiving space (33) and wherein the hood (34) covers the receiving space (33).

3. The ring saw (2) as claimed in claim 2, wherein the driving wheel (6), the guide roller (41), and the guide roll (43) are disposed in the receiving space (33).

4. The ring saw (2) as claimed in claim 1, wherein a section of a lateral surface (49) of the guide roll (43) which faces the cutting plane (E) extends parallel to the cutting plane (E).

5. The ring saw (2) as claimed in claim 1, wherein the hood (34) is lockable on a machine housing (31).

6. The ring saw (2) as claimed in claim 1, wherein the hood (34) is openable and closable by an actuating lever (35).

7. A ring saw (2), comprising:
    a ring saw blade (1);
    a tool holder (5), wherein the tool holder (5) guides the ring saw blade (1) in a cutting plane (E);
    a motor (30);
    a driving wheel (6), wherein the ring saw blade (1) is drivable in the cutting plane (E) by the driving wheel (6) and wherein the driving wheel (6) is coupled to the motor (30);
    a guide roller (41) which is disposed on a first side of the cutting plane (E), wherein the ring saw blade (1) is guidable by the guide roller (41) from the first side; and
    a guide roll (43) which is disposed on a second side of the cutting plane (E), wherein the ring saw blade (1) is guidable by the guide roll (43) from the second side;
    wherein the guide roll (43) is disposed in a hood (34) that is pivotable relative to the cutting plane (E);
    wherein an actuating lever (35) has an opening position and a closing position, wherein the hood (34) and the driving wheel (6) are coupled to the actuating lever (35) such that, in the closing position, the hood (34) is closed and the driving wheel (6) is pressed against the ring saw blade (1) and, in the opening position, the hood (34) is open and the driving wheel (6) is at a distance from the ring saw blade (1).

8. The ring saw (2) as claimed in claim 7, wherein, proceeding from the closing position into the opening position, the actuating lever (35) first moves the driving wheel (6) and then opens the hood (34).

* * * * *